United States Patent
Adam et al.

(10) Patent No.: US 9,882,963 B2
(45) Date of Patent: Jan. 30, 2018

(54) DISTRIBUTED TEST SYSTEM ARCHITECTURE

(71) Applicant: AFL Telecommunications LLC, Duncan, SC (US)

(72) Inventors: Sean Patrick Adam, Wrentham, MA (US); Joseph Fitzgerald, Concord, NH (US); Scott Prescott, Belmont, NH (US); Michael John Leighton, Deerfield, NH (US)

(73) Assignee: AFL Telecommunications LLC, Duncan, SC (US)

( * ) Notice: Subject to any disclaimer, the term of this patent is extended or adjusted under 35 U.S.C. 154(b) by 143 days.

(21) Appl. No.: 14/440,507

(22) PCT Filed: Nov. 5, 2013

(86) PCT No.: PCT/US2013/068595
§ 371 (c)(1),
(2) Date: May 4, 2015

(87) PCT Pub. No.: WO2014/071414
PCT Pub. Date: May 8, 2014

(65) Prior Publication Data
US 2015/0304397 A1   Oct. 22, 2015

Related U.S. Application Data

(60) Provisional application No. 61/722,578, filed on Nov. 5, 2012.

(51) Int. Cl.
*G06F 15/16* (2006.01)
*H04L 29/08* (2006.01)
(Continued)

(52) U.S. Cl.
CPC .......... *H04L 67/10* (2013.01); *H04L 41/0856* (2013.01); *H04L 41/12* (2013.01); *H04L 41/5041* (2013.01); *H04L 43/50* (2013.01)

(58) Field of Classification Search
None
See application file for complete search history.

(56) References Cited

U.S. PATENT DOCUMENTS 6,085,156 A * 7/2000 Rust ....................... G05B 19/00
                                                        702/91
6,363,519 B1   3/2002 Levi et al.
(Continued)

FOREIGN PATENT DOCUMENTS

CN   101430674 A   5/2009
CN   101776994 A   7/2010

OTHER PUBLICATIONS

AFL Telecommunications LLC, European Patent Application No. 13851905.3; Extended European Search Report; dated Mar. 16, 2016; 3 pages.

(Continued)

*Primary Examiner* — Cheikh Ndiaye
(74) *Attorney, Agent, or Firm* — Dority & Manning, P.A.

(57) ABSTRACT

The present invention is related to a method of connecting a first device comprising a processor and an application and a second device comprising a processor and an application, a distributed architecture system for facilitating modular communication between a plurality of applications, a plurality of devices, and a plurality of applications and devices, and a computer readable medium storing a program for causing a processor to connect a plurality of applications, a plurality of devices, and a plurality of applications and devices.

6 Claims, 6 Drawing Sheets

(51) Int. Cl.
*H04L 12/24* (2006.01)
*H04L 12/26* (2006.01)

(56) References Cited

U.S. PATENT DOCUMENTS

| | | | | |
|---|---|---|---|---|
| 6,381,656 | B1* | 4/2002 | Shankman | G06F 11/3485 |
| | | | | 710/18 |
| 7,895,282 | B1 | 2/2011 | Wang et al. | |
| 7,925,464 | B1* | 4/2011 | Bazemore | G01S 7/40 |
| | | | | 702/118 |
| 7,937,438 | B1* | 5/2011 | Miller | H04L 41/12 |
| | | | | 370/397 |
| 2002/0184326 | A1* | 12/2002 | Thomson | H04L 67/12 |
| | | | | 709/208 |
| 2006/0092861 | A1* | 5/2006 | Corday | H04L 41/0213 |
| | | | | 370/256 |
| 2008/0065716 | A1* | 3/2008 | Wright | H04L 67/025 |
| | | | | 709/203 |
| 2009/0016714 | A1* | 1/2009 | Soto | H04B 10/071 |
| | | | | 398/20 |
| 2010/0076715 | A1 | 3/2010 | Yu et al. | |
| 2010/0240317 | A1 | 9/2010 | Giles et al. | |
| 2011/0023025 | A1 | 1/2011 | Eldering | |
| 2011/0167430 | A1* | 7/2011 | Ahmed | G06F 9/54 |
| | | | | 719/313 |
| 2014/0053166 | A1* | 2/2014 | Moore | G06F 9/54 |
| | | | | 719/316 |

OTHER PUBLICATIONS

International Search Report of PCT/US2013/068595, dated May 19, 2014. [PCT/ISA/210].
Search Report dated Nov. 2, 2016 for Chinese Patent Application 201380064188.X.

* cited by examiner

Custom base unit running "Platform" and containing an OTDR Physical Instrument and a CWDM Physical Instrument and running an OLS Virtual Instrument (controlling Light Source Physical Instrument on PC)

iPad running "Platform" and
OTDR Virtual Instrument (controlling
OTDR Physical Instrument on Custom
Base Unit)

A Window PC running "Platform" and a Channel Checker Virtual Instrument (controlling CWDM Physical Instrument on Custom Based Unit) and a Power Meter Virtual Instrument (controlling Power Meter Physical Instrument on PC) and a Power Meter Physical Instrument and a Light Source Physical Instrument

DISTRIBUTED TEST SYSTEM ARCHITECTURE

CROSS REFERENCE TO RELATED APPLICATIONS

This application is a National Stage of International Application No. PCT/US2013/068595 filed Nov. 5, 2013, claiming priority based on U.S. Provisional Patent Application No. 61/722,578, filed Nov. 5, 2012, the contents of all of which are incorporated herein by reference in their entirety.

BACKGROUND

1. Field

The invention relates to a method of connecting applications to applications, hardware to hardware, and applications to hardware, and a distributed architecture system for facilitating modular communication between a plurality of applications, a plurality of devices, and a plurality of applications and devices.

2. Background

Today's Test and Measurement systems are monolithic in nature where a given system supports at most a handful of closely related, tightly integrated stimulus and measurement capabilities. Systems take on the personality and characteristics of the specific stimulus and measurement capability and are limited to supporting this personality and characteristics. Even systems which are designed on a modular platform are truly monolithic in nature where only a given set of closely related, tightly integrated capabilities can be supported at a given time. To support a different capability, the modular system must transform to this new capability completely. Often systems have to be powered down and re-powered back up so that the monolithic software can install the specific drivers for the installed hardware capability.

Today's monolithic, non-distributed systems limit the ability of the user to support different measurement and stimulus capabilities simultaneously. These solutions also require a tight coupling, typically through direct hardware connection. The exposure of the stimulus and measurement capability through a User Interface is tightly coupled with the actual stimulus and measurement hardware. The User Interface is also heavily integrated with the system software. Even if the User Interface is created as a separate Application Layer, it is tightly coupled with the system software, the system hardware, and the module hardware. The module driver is also heavily integrated with the system software. This is clearly shown in those situations where the system must be fully restarted when the module is changed so the new personality and the new module driver can be loaded specifically. With today's systems, a user cannot test their entire system unless that system is covered by the handful of closely related, tightly integrated stimulus and measurement capabilities.

As an example, customers often wish to test a complete communication network path crossing the fiber optic/copper boundary. They want to measure the transmission characteristics and signal parameters on the fiber component of the network and also measure the transmission characteristics and signal parameters on the copper component of the network. Today, a customer would have to either have two completely different units—one configured as a fiber test platform and one configured as a copper fiber test platform (assuming a modular platform). It may be very expensive to have two complete modular systems. Otherwise, if the customer wants to control costs, the customer needs to configure their modular system as a fiber tester, test the fiber component and then reconfigure their modular system to a copper tester and test the copper component. This increases test time. This also increases opportunity for both false failures and false positives.

Today's monolithic software architectures are also specifically designed for a given hardware base. They are designed to run on a given Operating System (ex. Windows or Linux) but also on a custom designed set of hardware made up processor, memory, support peripherals, storage, and communication. To support movement to a different hardware base, the software would need to be redesigned and re-architected as it is tightly integrated with the hardware it runs on. Though a new processor of similar capability can be designed into their hardware base, a wholesale change to a different hardware base, or a different Operating System is not possible due to the closely integrated nature of their system design.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the present invention utilizes a method of connecting a first device comprising a processor and a first application and a second device comprising a processor and a second application including registering at least one of the first device and the first application with a configuration manager, at least one of the second device and the second application requesting the configuration manager for connection information of a device comprising a processor and an application, providing the connection information of at least one of the first device and the first application to at least one of the second device and the second application, and at least one of the second device and the second application directly communicate with at least one of the first device and the first application based upon the connection information.

Other features of the embodiment may include the first device having a plurality of devices which have a plurality of applications, the configuration manager has an application manager that maps connectivity between defined devices and applications, the connection manager defines all devices and all applications in the system, and the defined devices and the defined applications communicate directly with each other when the defined devices and applications are configured and mapped.

Other features of the embodiment may include the second device having a plurality of devices having a plurality of applications, the configuration manager comprises an application manager that maps connectivity between defined devices and applications, the connection manager defines all devices and all applications in the system and the defined devices and the defined applications communicate directly with each other when the defined devices and applications are configured and mapped.

Other features of the embodiment may include the first device having a plurality of devices having a plurality of applications, the configuration manager defines all devices and applications in a virtual system spread across multiple physical machines, an application manager that maps connectivity between configured devices and applications regardless of the physical machine they are running on, and the devices and the applications communicate directly once configured and mapped.

Other features of the embodiment may include the second device having a plurality of devices having a plurality of applications, the configuration manager defines all devices and all applications in a virtual system spread across multiple physical machines, an application manager maps connectivity between configured devices and applications regardless of the physical machine they are running on; and the devices and the applications communicate directly once configured and mapped.

Another embodiment of the invention may include a method of connecting a plurality of applications, a plurality of devices, and a plurality of applications and devices, where the method involves a first device comprising a processor sending a request to a remote connection configuration in a distributed architecture system, an application manager in the distributed architecture system receiving the request by means of the remote connection configuration, the application manager requesting a service manager to find a second device corresponding to the request by means of the remote connection configuration, the service device communicating with the second device and identifying a location of the second device, the service manager sending information on the location of the second device to the application manager, the application manager receiving and sending the information on the location of the second device to the first device through the remote connection configuration, and the first device directly communicating with the second device based upon the information on the location provided by the application manager.

Another embodiment of the invention may include a distributed architecture system for facilitating modular communication between a plurality of applications, a plurality of devices, and a plurality of applications and devices, including an application manager which receives a request to a remote connection configuration from a first device among the plurality of devices; a service manager which searches for a second device corresponding to the request to the remote connection configuration, communicates with the second device and identify a location of the second device; and sends information on the location of the second device to the application manager, where the application manager sends the information on the location of the second device to the first device through the remote connection configuration such that the first device directly communicates with the second device based upon the location provided by the application manager.

Other features of the embodiment may include an application used by the application manager having a Foundation Application Programming Interface (API), where the Foundation API has at least one of, a power API, a licenses API, a Plugin API, an ASYNC API, a package management API, an intent API, a Setting API, a Data Storage API, an Inter Process Communication API, an Export/Import API, an Error Handling/Management API, and a Network Configuration API.

Another embodiment of the invention may include a computer readable medium storing a program for causing a processor to connect a plurality of applications, a plurality of devices, and a plurality of applications and devices, including at least one of a first device or a first application sending a request to a remote connection configuration in a distributed architecture system an application manager in the distributed architecture system receiving the request to the remote connection configuration, the application manager requesting a service manager to find at least one of a second device or a second application corresponding to the request to the remote connection configuration, the service device communicating with at least one of the second device or the second application and identifying a location of at least one of the second device or the second application, the service manager sending information on the location of at least one of the second device or the second application to the application manager, the application manager receiving and sending the information on location of at least one of the second device or the second application to at least one of the first device and the first application through the remote connection configuration, and at least one of the first device or the first application directly communicating with at least one of the second device or the second application based upon the information on the location provided by the application manager.

DETAILED DESCRIPTION

Figure 1:
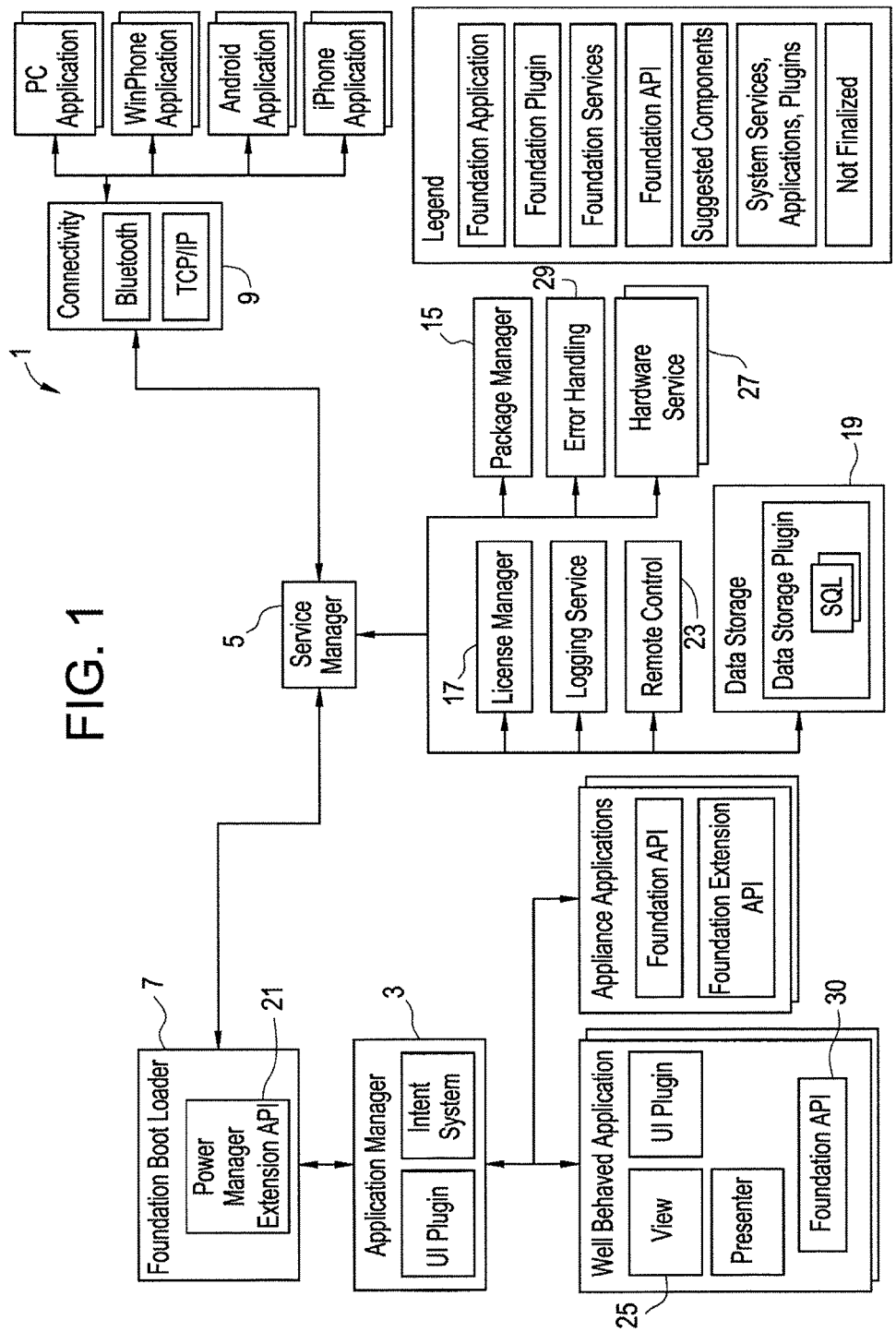
FIG. 1 is a diagram of an exemplary embodiment of a device management system.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

The present invention applies to distributed architecture which separates a test and measurement system into key components of which all are interchangeable on a hardware and software level. An exemplary embodiment of the present invention comprises a hardware-agnostic, application-agnostic Test Operating System (referred to as a Platform), a virtual instrumentation layer which allows for any given stimulus and measurement capability to be abstracted to an unlimited number of User Experiences, a physical instrument layer which allows for any given stimulus and measurement capability to be wrapped in such a manner as it can easily connect with any hardware system running the Platform and offer up services which can be abstracted to the user as a User Experience through the Virtual Instrument Layer, and Test Executable Layer which separates the actual test execution from the system software allowing for custom and user-defined test programs to be developed.

In an exemplary embodiment, the Platform is a hardware agnostic entity, thus the Platform can run on any hardware and Operation System base which provides the minimum services required to run. In an exemplary embodiment, the minimum services may comprise an ARM based single board computer based on NVIDIA Tegra 2 & 3, Freescale Vybrid and Intel/Marvell XScale (PXA270, PXA300, PXA310, PXA320) such as the Toradex Colibri Computer Module, supporting hardware to provide wired and wireless connectivity, and a NAND Flash memory.

Therefore, the Platform can reside on systems built upon many Operating Systems and hardware comprising a microprocessor core and sufficient memory to support the Platform. Exemplary embodiments of Operating Systems comprise Android, Linux, Windows, etc.

In an exemplary embodiment, the Platform is an application agnostic entity, thus the Platform is not tied to any given stimulus and measurement capability or any given user experience. As such, an exemplary embodiment of the Platform is not limited to test and measurement systems and could reside on any minimally capable hardware system and support any hardware or software component which can be wrapped in a Physical Instrument Layer and support a user experience for a Physical Instrument as embodied in a Virtual Instrument Layer. In an exemplary embodiment, a physical instrument layer comprises a radio. In a second exemplary embodiment, the physical instrument layer comprises test equipment. In an exemplary embodiment, a complete functioning system made up of one or more Virtual Instruments, one or more Physical Instruments, and a Test Executable can be established on said hardware. Exemplary embodiments of hardware may comprise an iPad, a Nexus 7, or a Lenovo x230.

In an exemplary embodiment, the Platform is hardware agnostic, which allows the Platform to reside on a plurality of hardware systems at one time, wherein each of the hardware systems comprise a minimum processing and memory capability to support the Platform. In an exemplary embodiment, the Virtual Instrument Layer, the Physical Instrument Layer, and the Test Executable Layer are not tightly integrated, which allows each layer to reside on hardware systems that are separate from the Platform.

In an exemplary embodiment, the Virtual Instrument Layer is not tightly coupled with a Physical Instrument, thus more than one Virtual Instrument abstraction can run for a given Physical Instrument. This enables the functionality of a given Physical Instrument to be exposed in multiple different manners providing a greater flexibility of end-usage. For example, a Physical Instrument comprises an LED. The LED can be exposed as a Virtual Instrument which abstracts the LED to the user. In an exemplary embodiment, the LED may be abstracted to the user as a Flashlight (the LED turns on and off), a Random Light Pattern Maker, and a Morse Code Visual Signaling device. In an exemplary embodiment, each Virtual Instrument can reside on the hardware system simultaneously and can run simultaneously if the given desired application implementation demands or benefits from simultaneous execution.

In an exemplary embodiment, the Physical Instrument is not tightly coupled with the Platform, thus a plurality of hardware and software capabilities can exist simultaneously and run simultaneously within the given hardware system. For example, an Optical Light Source Physical Instrument, an Optical Power Meter Physical Instrument, and a Copper Power Meter Physical Instrument can be simultaneously supported on a given complete system running the Platform and provide the user the capability to test an optical-copper link from end-to-end. In an exemplary embodiment, a complete system may comprise the minimum system to support the Platform as referenced above, stimulus and measurement hardware for each of the Physical Instruments, and either hardwired or wireless connectivity between the hardware system hosting the Platform, wherein the hardware systems embodies the stimulus and measurement (such as a OPM Module, OLS Module, CPM Module).

In an exemplary embodiment, a complete system may comprise a Lenovo X320 laptop running the Platform. In an exemplary embodiment, three independent modules (OPM, OLS, CPM) each have their own battery, their own onboard processing, and their own wireless link. In an exemplary embodiment, each module is wirelessly connected to the laptop via 802.11g. In an exemplary embodiment, the Physical Instrument Driver for each module would be executed on the Lenovo Laptop. In an exemplary embodiment, different Virtual Instrument Drivers would run on the laptop and interface with the Platform. The above system would give a complete test system buildable upon any laptop and infinitely configurable with Physical Instrument Modules and Virtual Instruments.

In an exemplary embodiment, a Virtual Instrument is not tightly coupled with the Physical Instrument, thus a Virtual Instrument can be developed which interfaces with one or more Physical Instruments. In an exemplary embodiment, the complete system described above can expose an OLS Virtual Instrument, an OPM Virtual Instrument, and a CPM Virtual Instrument simultaneously, or a single Virtual Instrument for a Fiber-Copper Link Tester can be exposed which wrappers all three Physical Instruments into a single application.

In an exemplary embodiment, the Platform layer is hardware agnostic and the Physical and Virtual Instrument layers are not tightly coupled, thus the communication protocol between said pieces is flexible and is defined only for a given complete system incarnation and meeting the minimum requirements of the Physical Instrument embodiment. In other words, as communication technology improves (copper, Bluetooth, Wifi, etc) the complete system is unlimited by the actual architecture implementation through the "Platform" and "Virtual Instrument" layer.

Referring to the drawings, FIG. 1 is a diagram of an exemplary embodiment of a distributed test system architecture 1. In an exemplary embodiment, the system 1 comprises core components, which comprise an application manager 3, a service manager 5, a foundation loader 7, and an inter process communicator 9. In an exemplary embodiment, the application manager 3 monitors applications in the system 1, detects crashes in the system, informs an error handling management component 29 if a crash is detected, and ensures that each application in the system performs an application lifecycle. In an exemplary embodiment, the application lifecycle comprises a start, and onresume, an onpause, and a stop.

In an exemplary embodiment, the service manager 5 is responsible for how a service should be started, when the service should be started, when the service should be shut down, supporting the restarting of services, grants application access to services, revokes application access to services, provides an Application Programming Interface (API) that will get a list of all available services on the system and their current state, starts services when system actions have been detected, and supports modular hardware. Exemplary embodiments of system actions comprise OnStart, OnDemand, OnEvent, and manual. In an exemplary embodiment, the service manager 5 may be accessed remotely.

In an exemplary embodiment, OnDemand is a system action which allows a service to be started only when an application has requested it. OnDemand is a system action which allows a service to shut down once that application informs the service manager that it is no longer required. In an exemplary embodiment, OnStart is a system action which allows a service to start with the system 1 and remain running at all times. In an exemplary embodiment, OnEvent is a system action which allows a service to start when a watcher plugin has detected some event. In an exemplary embodiment, Manual is a system action which allows an application to start and stop a service.

In an exemplary embodiment, the foundation loader 7 starts both the Application Manager and Service Manager, and is in control of system level power management. In an exemplary embodiment, the foundation boot loader comprises the minimum services described above.

In an exemplary embodiment, the remote connection configuration 9 allows the system 1 to communicate between itself, applications, and other systems. Exemplary embodiments of a remote connection configuration comprise wired Ethernet, WiFi, Bluetooth, and other connection means such as IP addressing, Proxy, and VPN. Exemplary embodiments of applications and other systems comprise an android system, an iPhone, a WinPhone, and a PC Application.

In an exemplary embodiment, various secondary components can complement the performance of the core components. In an exemplary embodiment, the secondary components comprise a Package Manager 15, a License Manager 17, a Data Storage Manager 19, a Power Management Extension 21, a Remote Device Control 23, a Remote Service Access (not shown), a Visual Studio Templates 25, a Hardware Service 27, and an Error Handling Management component 29.

In an exemplary embodiment, a Foundation API 30 is contained within the well-behaved application and the appliance application.

Figure 2:
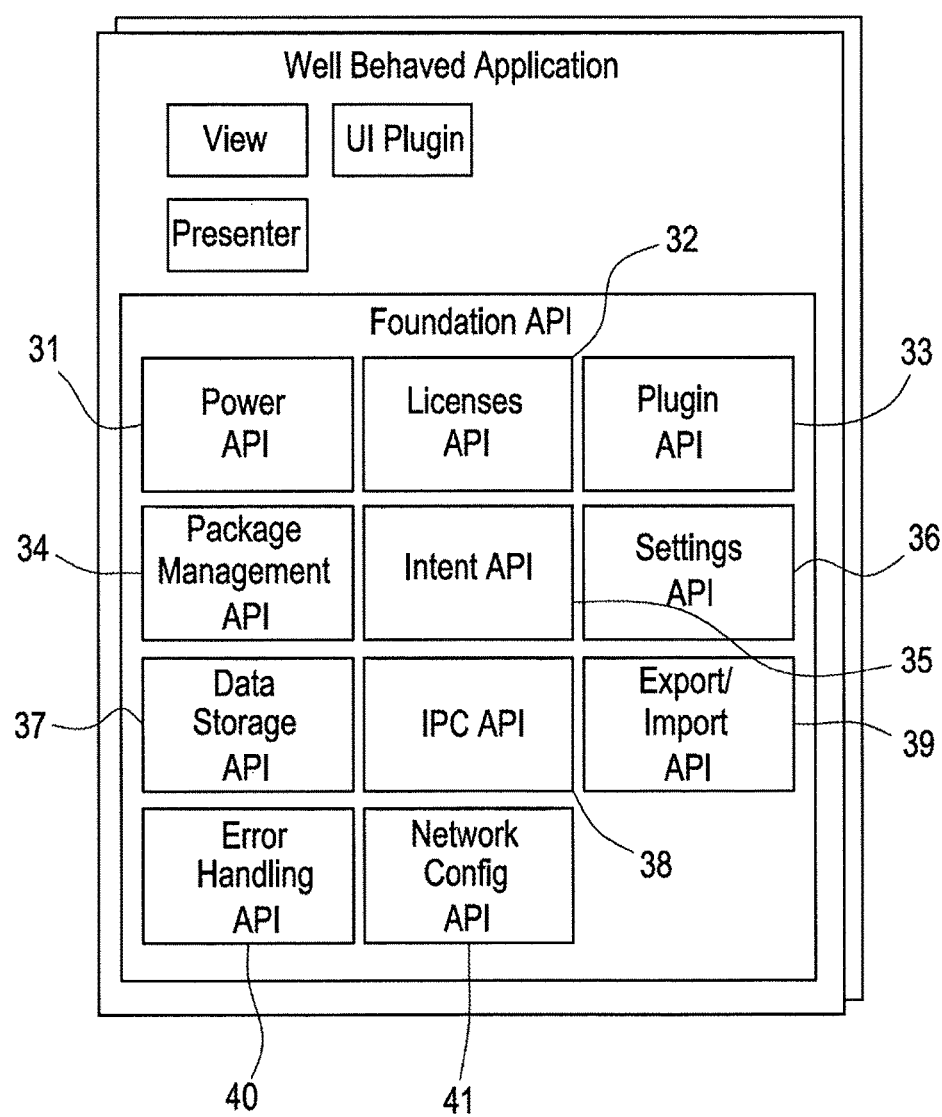
FIG. 2 is an exemplary embodiment of a foundation API 30 contained within a well-behaved application.

FIG. 2 is an exemplary embodiment of a Foundation API 30 contained within a well-behaved application. In an exemplary embodiment, the Foundation API 30 comprises a power API 31, a licenses API 32, a Plugin API 33, an ASYNC API (not shown), a package management API 34, an intent API 35, a Setting API 36, a Data Storage API 37, an Inter Process Communication API 38, an Export/Import API 39, an Error Handling/Management API 40, and a Network Configuration API 41.

In an exemplary embodiment, the power API provides access to current power status, provides the ability to dim the screen in periods of inactivity, provides the ability to shut off the screen in periods of inactivity, provides the ability to shut down the system at specific power levels, provides the ability to shut down the system with a specific API call, provides the ability to restart the system with a specific API call, and provides the ability to suspend the system with a specific API call.

In an exemplary embodiment, the licenses API 32 installs licenses, requests information, such as type, about a given license, removes licenses, verifies licenses, provides an override mechanism that will force a manager to return true for a license request, supports remote and local connectivity, supports a number of license types including full, trial, and count limited licenses, and is secure enough to pass a "Fired Employee Test".

In an exemplary embodiment, the Plugin-API 33 obtains a list of all classes in a given assembly and dynamically loads classes from specific assemblies at runtime. In an exemplary embodiment, the ASYNC API performs background operations without having to use a .NET thread class, updates a UI without special developer code to invoke threads, and removes the complexity of join, cancel, and synchronize functions from the developers hands.

In an exemplary embodiment, a package management API 34 installs service and applications for the Foundation API, downloads packages from various locations (e.g. USB, Network Server, Cloud, etc.), checks software dependencies during package installations, maintains a package repository, define and enforce structure for valid Foundation packages, and comprises a system package which installs core services on a new unit. In an exemplary embodiment, the package management API 34 exists on a unit OS before any other applications or services are installed on that unit.

In an exemplary embodiment, an intent API 35 sends an intent class to an application launcher. The launcher will determine if an application that could fill the intent can be found on the system. If one is found, the application will be started, the intent will passed to the applications, the application will then return a message that will flow through the application launcher and back to the original application.

In an exemplary embodiment, a setting API 36 generates simple application settings classes. In an exemplary embodiment, the setting API 36 loads a settings file with 100 simple types in under 500 ms, saves a settings file with 100 simple types under 500 ms, supports migration natively, and supports all basic types including integer, float, double, and string.

In an exemplary embodiment, the data storage API 37 includes methods to create, retrieve, update, and delete any data element needed by an application or service; is accessible as a standard on-device or off-device (remote) service; supports multiple data storage medium types in its API; provides a SQL database data store plugin, and supports adding data store plugins during upgrades.

In an exemplary embodiment, an Inter Process Communication API 38 allows for cross process communications. In an exemplary embodiment, the Inter Process Communication API 38 provides a mechanism to call methods in a different process, sends large amounts of data (>256 KB) from one process to another in under 1 sec, provides a mechanism for two way communication, provides a mechanism for sending structured data such as objects, and generates client side code from a given interface. Exemplary embodiments of mechanisms for the Inter Process Communication API are Windows Messaging for a Windows system and Named Pipes for a Unix or Linux system.

In an exemplary embodiment, an export/import API 39 extracts specified data from a device to leverage it for other purposes, which is called exporting, and adds data to a device so that the device can use it for various purposes, which is called importing. In an exemplary embodiment, the export/import API 39 provides support for copying files to and from a unit, imports simple CSV (comma separated value) files into a data store plugin medium, exports data from a data store plugin medium to a CSV file, provides hooks for a user to design personalized import or export plugins, and export data from data store plugin to either a PDF document, a DB file, or an XML file.

In an exemplary embodiment, an error handling/management API 40 provides error handling functionality across all of the services and applications in the system 1. In an exemplary embodiment, the error handling functionality comprises error detection with error reception; error recovery, which handles saving a state of running applications and services as well as scheduling and execution of failover options; error logging, which automatically logs and shares certain errors via the logging service; and notification, which allows apps and services to register for certain errors and notifies the apps or services when those errors occur. In an exemplary embodiment, errors may be classified as "Fatal", "Critical", "Error", "Warning", "Informational", and "Debug."

In an exemplary embodiment, a Network Configuration API 41 provides the ability to control IP addressing. In an exemplary embodiment, the Network Configuration API 41 obtains IP addresses from a DHCP server on the network, and provides the ability to set Provide the ability to set a known IP address, a subnet mask, a gateway address, and primary and secondary DNS Addresses in a static address system. In a proxy, the Network Configuration API 41 has the ability to set a Proxy server name, a port, a username, and a password.

In an exemplary embodiment, the secondary components shown in FIG. 1 are runtime components of the Foundation API. In other words, the secondary components are processes that will start up with the system. In an exemplary embodiment, the API's built into every Foundation application will interact with the runtime components to perform their tasks. In an exemplary embodiment, the package management API 34 interacts with the Package Manager 15 to perform the associated tasks.

Figure 3:
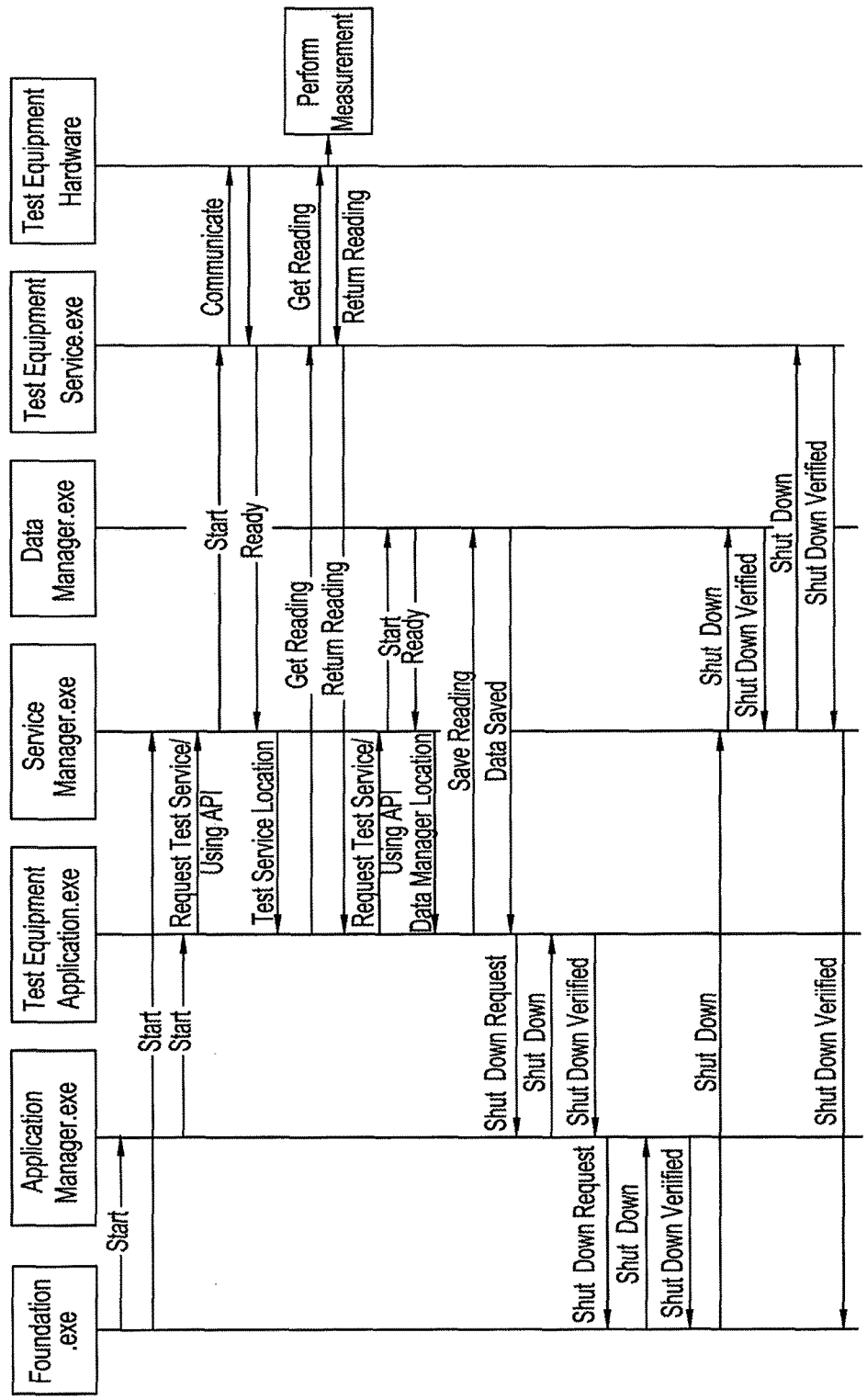
FIG. 3 is a flowchart of an exemplary embodiment of a process in which a Foundation API utilizes a system for communication.

FIG. 3 is a flowchart of an exemplary embodiment of a plurality of processes in which a Foundation API utilizes a system for communication between a first application/device and a second application/device.

In an exemplary embodiment, the first step of a method is that a first application/device makes a request to a remote connection configuration in a distributed architecture system. In a second step, the request is processed by a service manager in the system. In a third step, the service manager communicates with the second application/device and identifies a location of the second application/device. In an exemplary embodiment, the second application/device is test equipment hardware, as shown in FIG. 3. In a fourth step, the service manager sends the location of the second application/device to the first application/device through the remote connection configuration. In a fifth step, the first application/device communicates directly with the second application/device based upon the location provided by the system. In an exemplary embodiment, FIG. 3 shows the first application/device obtaining a reading from the second application/device based upon the location provided by the system.

In an exemplary embodiment, the first application/device is a laptop and the second application/device is a fax machine, scanner, or printer. In an exemplary embodiment, the steps of the above method are produced without identifying a head for the system.

Figure 4A:
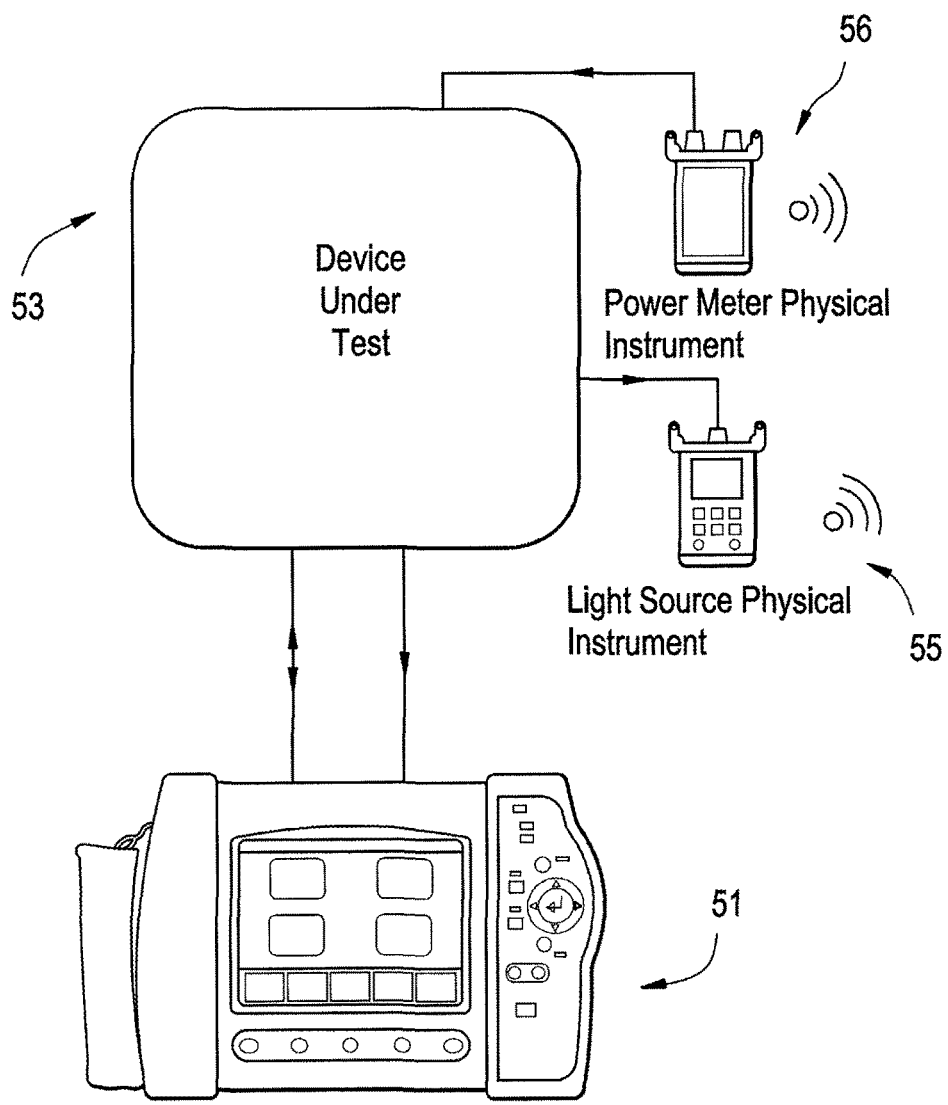
FIG. 4A is a diagram of an exemplary embodiment of a device running Platform connecting with a plurality of devices.

FIG. 4A is a diagram of an exemplary embodiment of a device running Platform connecting with a plurality of devices. In an exemplary embodiment, a custom base unit 51 comprises an OTDR Physical instrument, a CWDM Physical Instrument, and an OLS Virtual Instrument, which controls the Light Source Physical Instrument 56. In an exemplary embodiment, the custom base unit 51 facilitates communication between itself, the Light Source Physical Instrument 55, the Power Meter Physical Instrument 56, and the Device under test 53. In an exemplary embodiment, the Power Meter Physical Instrument and the Light Source Physical Instrument are on a Personal Computer (PC)

Figure 4B:
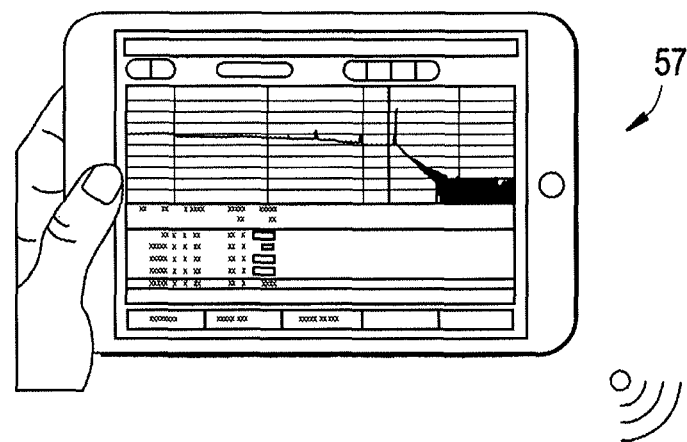
FIG. 4B is a diagram of a second exemplary embodiment of a device running Platform.

FIG. 4B is a diagram of a second exemplary embodiment of a device running Platform. In an exemplary embodiment, the second device 57 runs Platform and OTDR Virtual Instrument, which controls the OTDR Physical Instrument on the custom base unit 51. In an exemplary embodiment, the second device 57 may be an iPad connected to the custom base unit 51 by a wireless connection.

Figure 4C:
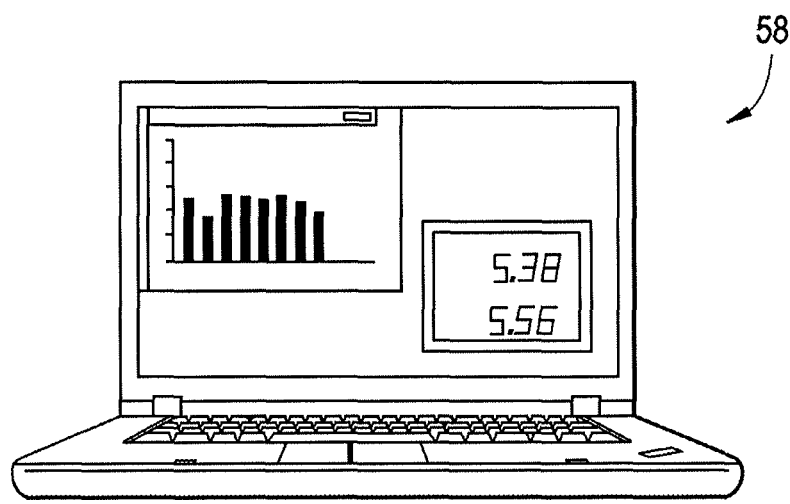
FIG. 4C is a diagram of a third exemplary embodiment of a device running Platform.

FIG. 4C is a diagram of a third exemplary embodiment of a device running Platform. In an exemplary embodiment, the third device 58 runs Platform and a Channel Checker Virtual Instrument, which controls a CWDM Physical Instrument on the custom base unit 51, a Power Meter Virtual Instrument, which controls the Power Meter Physical Instrument, and a Light Source Physical Instrument. In an exemplary embodiment, the third device 58 is a PC with a Windows OS.

In an exemplary embodiment, the Platform and the Virtual Instrument run on the iPad (second device 57) to control a separate Physical Instrument in the system. In an exemplary embodiment, the Platform runs on a specifically designed base unit which physically encompasses two different Physical Instruments. In an exemplary embodiment, the Platform and a plurality of Virtual Instruments run on the PC (third device 58) with multiple Physical Instruments connected, either wired or wirelessly, to separate Physical Instrument modules. In an exemplary embodiment, the devices of FIGS. 4A, 4B, and 4C work simultaneously to create a complete test system.

The invention claimed is:

1. A method of connecting a first device comprising a processor and a first application and a second device comprising a processor and a second application, the method comprising:

registering at least one of the first device and the first application within the first device with a configuration manager, wherein the first device comprises one of an Optical-based Physical Instrument, a Copper-based Physical Instrument, an Optical-based Virtual Instrument, or a Copper-based Virtual Instrument;

requesting, by at least one of the second device and the second application within the second device, the configuration manager for connection information of a device comprising a processor and an application, wherein the configuration manager comprises an application manager that maps connectivity between defined devices and applications, and wherein the second device comprises one of an Optical-based Physical Instrument, a Copper-based Physical Instrument, an Optical-based Virtual Instrument, or a Copper-based Virtual Instrument;

providing the connection information of at least one of the first device and the first application to at least one of the second device and the second application, wherein at least one of the second device or the second application directly communicate with at least one of the first device or the first application based upon the connection information;

wherein one of the first device, first application, second device, or second application controls another of the first device or second device to cause the other of the first device or second device to perform a measurement and to obtain a reading from the other of the first device or second device.

2. The method of claim 1, wherein the first device comprises a plurality of devices comprising a plurality of applications;

wherein the connection manager defines all devices and all applications in the system and the defined devices and the defined applications communicate directly with each other when the defined devices and applications are configured and mapped.

3. The method of claim 1, wherein the second device comprises a plurality of devices comprising a plurality of applications;

wherein the connection manager defines all devices and all applications in the system and the defined devices and the defined applications communicate directly with each other when the defined devices and applications are configured and mapped.

4. The method of claim 1, wherein the first device comprises a plurality of devices comprising a plurality of applications;

the configuration manager defines all devices and applications in a virtual system spread across multiple physical machines;

the application manager maps connectivity between configured devices and applications regardless of the physical machine they are running on; and the devices and the applications communicate directly once configured and mapped.

5. The method of claim 1, wherein the second device comprises a plurality of devices comprising a plurality of applications;

the configuration manager defines all devices and all applications in a virtual system spread across multiple physical machines;

the application manager maps connectivity between configured devices and applications regardless of the physical machine they are running on; and the devices and the applications communicate directly once configured and mapped.

6. A method of connecting a plurality of applications, a plurality of devices, and a plurality of applications and devices, the method comprising:

requesting, by a first device comprising a processor, to a remote connection configuration in a distributed architecture system, wherein the first device comprises one of an Optical-based Physical Instrument, a Copper-based Physical Instrument, an Optical-based Virtual Instrument, or a Copper-based Virtual Instrument;

receiving, by an application manager in the distributed architecture system, the request to the remote connection configuration;

requesting, by the application manager, a service manager to find a second device corresponding to the request to the remote connection configuration, wherein the second device comprises one of an Optical-based Physical Instrument, a Copper-based Physical Instrument, an Optical-based Virtual Instrument, or a Copper-based Virtual Instrument;

communicating, by the service device, with the second device and identifying a location of the second device;

sending, by the service manager, information on the location of the second device to the application manager;

receiving and sending, by the application manager, the information on the location of the second device to the first device through the remote connection configuration, wherein the application manager maps connectivity between defined devices; and directly communicating, by the first device, with the second device based upon the information on the location provided by the application manager, wherein one of the first device or second device controls another of the first device or second device to cause the other of the first device or second device to perform a measurement and to obtain a reading from the other of the first device or second device.

* * * * *